INVENTOR.
RICHARD W. HAUTZENROEDER
BY
Oberlin & Limbach
ATTORNEYS

Nov. 9, 1948.　　R. W. HAUTZENROEDER　　2,453,128
TRANSMISSION

Filed Feb. 10, 1945　　　　　　　　　　　　3 Sheets-Sheet 3

INVENTOR.
RICHARD W. HAUTZENROEDER
BY
Oberlin + Limbach.
ATTORNEYS

Patented Nov. 9, 1948

2,453,128

UNITED STATES PATENT OFFICE 2,453,128

TRANSMISSION

Richard W. Hautzenroeder, Mansfield, Ohio

Application February 10, 1945, Serial No. 577,231

4 Claims. (Cl. 103—162)

This invention relates as indicated to transmissions and more particularly to a novel device for the purpose of transmitting power by means of a fluid medium. In the broader aspects of the invention will be found certain novelty in the construction of both the pump and motor which form the component parts of the transmission assembly.

It is a principal object of my invention to provide a device of the character described and by which there may be an infinite variation in the relative rates of rotation of the two shafts which for convenience may be termed the power input shaft and the power output shaft.

It is a further and more particular object of my invention to provide a device of the character described which is not only relatively simple and accordingly may be constructed at a relatively low cost, but which is also, as a result of such simplicity, not only extremely rugged but also capable of ready adjustment to effect the desired change of speed ratio between the two shafts.

Other objects of my invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings—

Figure 1:
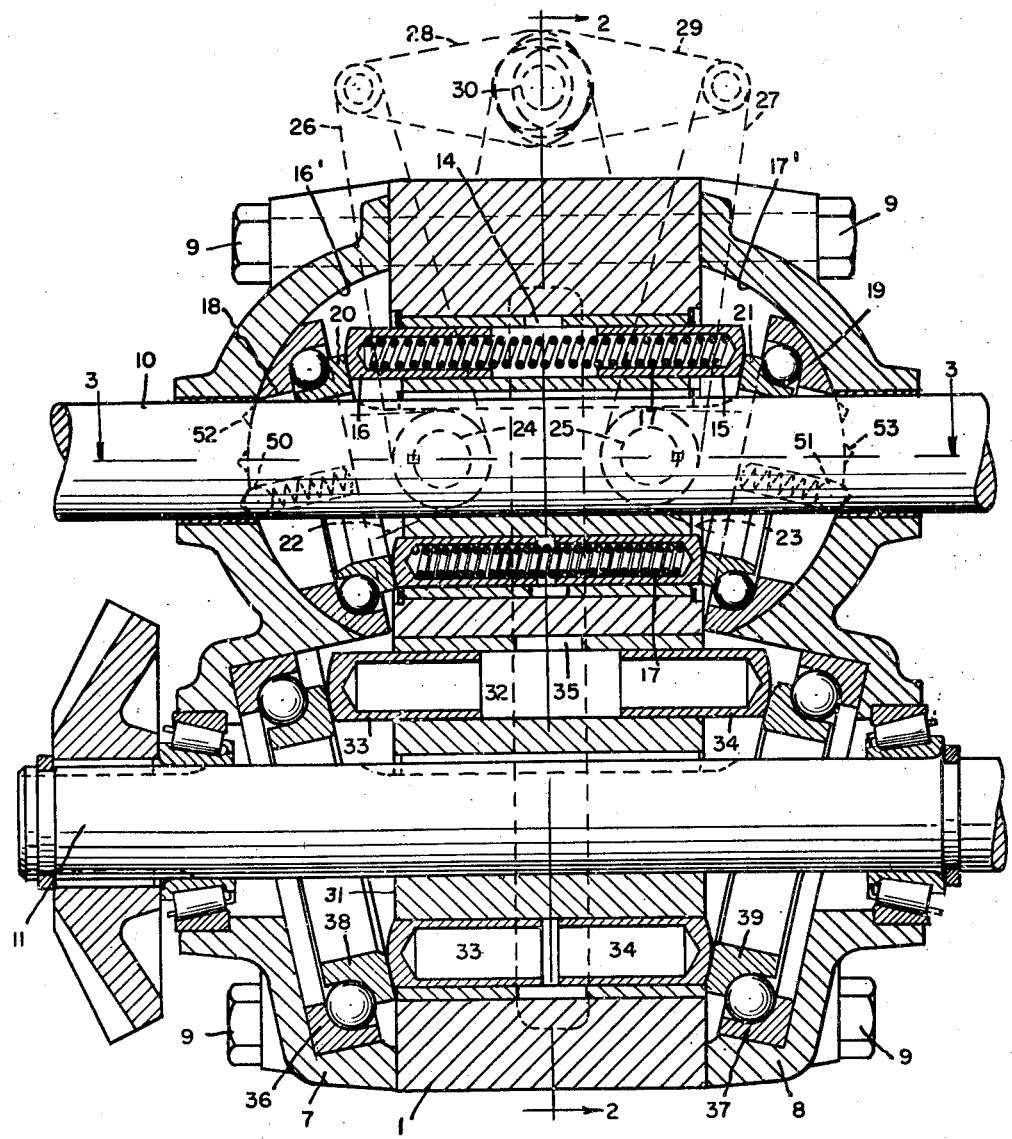
Fig. 1 is a vertical sectional view through one embodiment of my invention.

Referring now more particularly to the drawings and more especially to Fig. 1, the device here illustrated as one embodiment of my invention comprises a central body portion generally indicated at 1 and which will be referred to hereinafter for convenience as the stator. The cross-sectional form of the stator 1 is most clearly illustrated in Fig. 2 and includes interior cavities 2 and 3 which are provided by means of grooves formed in the opposed inner faces of the stator unit. The cavity 2 may be referred to for convenience as the low pressure cavity, whereas the cavity 3 may be referred to as the high pressure cavity when the apparatus is operated so that the parts rotate in the direction indicated by the arrows appearing thereon.

Extending transversely of the cavities 2 and 3 and separating the same is a bridge member 4. Removably secured to the opposite sides of the stator unit 1 are end plates 7 and 8. These end plates, in the illustrated embodiment of my invention, are made similar, that is, the two plates are identical. They are maintained in assembled relation on the stator unit by means of a plurality of bolts such as 9 which pass through the assembly.

Journalled in the upper ends of the end plates 8 and 9 is a power input shaft 10. This shaft may be referred to for convenience as the driving shaft. Journalled in the lower ends of the end plates 7 and 8 is a power output shaft 11 which may also be referred to as the driven shaft.

The upper portion of the assembly as illustrated in Fig. 1 is the pumping unit. The lower portion of the assembly is the motor unit. The pump delivers fluid under pressure to the inlet side of the motor and the same fluid, after being discharged from the outlet side of the motor, is returned to the inlet side of the pump. The apparatus, therefore, comprises a closed hydraulic circuit whereby the driving and driven shafts are coupled hydraulically through the medium of a pump and motor.

The pump unit which includes the driving shaft 10 also includes a rotor 12 keyed to the shaft 10 and provided with a plurality of axially extending cylindrical openings 13 which are arranged in equally spaced relation in an annular area of the rotor. The cylindrical openings 13 open outwardly on opposite faces of the rotor and intermediately of their ends open radially outwardly through passages 14. It will thus be observed that as the rotor is rotated in the direction indicated by the arrow on Fig. 2, i. e. clockwise, the cylindrical openings 13 will be progressively and sequentially brought into communication with the cavities 2 and 3. Mounted in the cylindrical openings 13 are opposed pistons 15 and 16 (Fig. 3) which are urged away from each other by means of springs 17.

The opposed faces of the upper ends of the plates 7 and 8 are substantially semi-spherical as indicated at 16' and 17'. Surrounding the shaft 10 on opposite sides of the stator are bearing pillow blocks 18 and 19 with their outer faces shaped to conform to the spherical surfaces 16' and 17' respectively. The anti-friction bearings supported by the pillow blocks 18 and 19 include annular members 20 and 21 respectively with which the opposite ends of pistons 15 and 16 are adapted to respectively engage.

Figure 3:
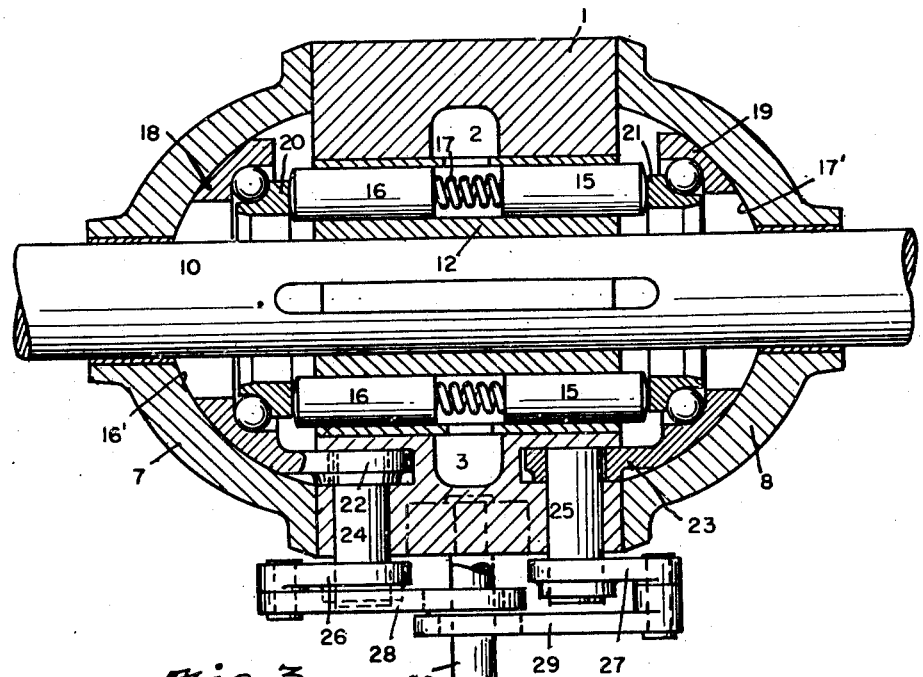
Fig. 3 is a transverse sectional view of the assembly illustrated in Fig. 1 taken on a plane substantially indicated by the line 3—3.

As most clearly illustrated in Fig. 3, the pillow blocks 18 and 19 are provided with arms 22 and 23 respectively which extend into slots in the opposed faces of the stator. The stator is provided with adjacent openings in which are journalled stub shafts 24 and 25 which at their inner ends are keyed to arms 22 and 23 respectively. To the outer ends of the arms 24 and 25 there are secured crank arms 26 and 27. These latter arms are connected by suitable links 28 and 29 to a common control shaft 30. As the shafts 24 and 25 are oscillated, the inclination of the annular bearing members 20 and 21 with respect to the axis of the shaft 10 is adjusted.

Figure 2:
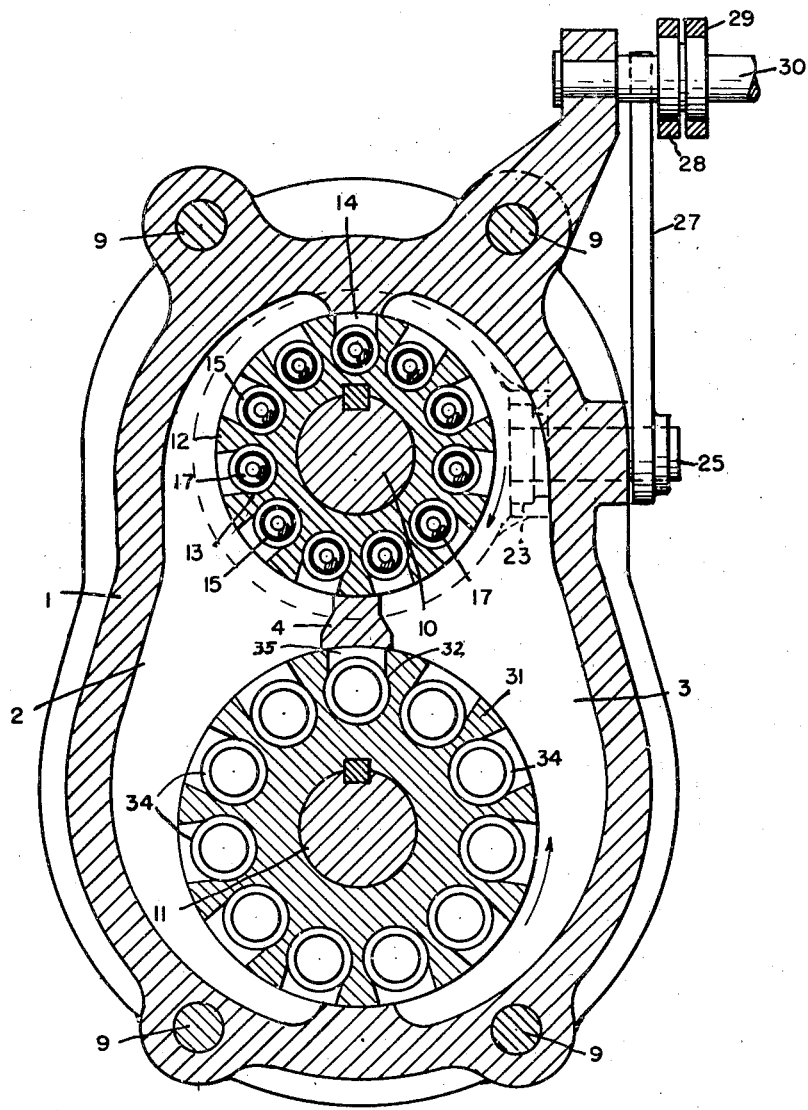
Fig. 2 is a vertical sectional view of the assembly illustrated in Fig. 1 taken on a plane substantially indicated by the line 2—2.

The motor portion of the assembly illustrated in Figs. 1 and 2 includes a rotor 31 keyed to the shaft 11. The rotor 31 is provided with a series of cylindrical openings 32 similar to the openings 13 in the pump portion of the apparatus, and in such cylindrical openings there are a plurality of pistons 33 and 34. The cylindrical openings 32 are provided with radially extending passages 35 by which the cylinders may be successively and sequentially placed in communication with the cavities 2 and 3 as the motor rotor 31 is caused to rotate.

Mounted in the opposed faces of the lower ends of the end plates 7 and 8 are anti-friction bearing assemblies 36 and 37 so mounted that the planes of their respective rotatable annular elements 38 and 39 are inclined by the same amount but in opposite directions to the axis of the shaft 11.

The operation of the assembly illustrated in Fig. 1 may be described as follows:

If it be assumed that the pillow blocks 18 and 19 are in the position illustrated in Fig. 1 and the pump is rotated in a clockwise direction, as viewed in Fig. 2, then the pistons 15 and 16 in the positions from 12 o'clock to 6 o'clock as viewed in Fig. 2 will be caused to move toward each other. This will result in the fluid, occupying the space between such pistons, being displaced outwardly through the passages 14 into the high pressure cavity 3. As pressure builds up in the cavity 3, this will effect a counter-clockwise rotation of the motor rotor 31. It will be observed that the pistons 33 and 34 in the 6 o'clock area of the rotor 31, as viewed in Fig. 2, are most closely together, i. e. they are in the position illustrated at the bottom of Fig. 1. The fluid under pressure in the cavity 3 has access to the space between the pistons through the openings 35. Such pressure will force the pistons 33 and 34 away from each other, i. e. the ends of the pistons in engagement with the annular bearing members 38 and 39 will be forced in effect to slide down an inclined plane causing the rotor 31 to rotate in a counter-clockwise direction.

Coincidental with the operation just described, the pistons 15 and 16 in the pump rotor, in the positions from 7 o'clock to 12 o'clock, will be separating, that is moving apart. The pistons 33 and 34 in the motor rotor 31, in the positions from 12 o'clock to 7 o'clock, will be moving toward each other so that the fluid displaced from the space between the pistons 33 and 34 will be moved upwardly in the low pressure passage 2 to fill the widening spaces between the pistons 15 and 16 of the pump.

From the foregoing description it will be observed that the relative speed of rotation of the shafts 10 and 11 is dependent upon the extent by which the pillow blocks 18 and 19 are inclined to the axis of the shaft 10. As such inclination is decreased, i. e. to a point where the working face of the members 20 and 21 lies at right angles to the axis of the shaft 10, the output in units of volume per revolution of the shaft 10 is progressively decreased until it becomes zero when the faces of the members 20 and 21 are at right angles to the shaft 10.

It will be observed that by moving the pillow blocks 18 and 19 to a position such that their inclination to the axis of the shaft 10 is opposite to that shown in Fig. 1, then the direction of fluid flow through the pump unit may be reversed and accordingly the direction of rotation of the motor rotor is also reversed.

If desired, the pillow blocks 18 and 19 may be provided with spring-loaded detents as illustrated in dotted lines at 50 and 51, which detents may releasably engage notches such as those indicated at 52 and 53 for the purpose of arresting the position of the pillow blocks at any desired place.

Instead of having the motor and pump units included in one housing as illustrated in Fig. 1, it is within the contemplation of my invention to have the motor and pumping units located in separate housings which makes possible the location of such units at different points on a particular piece of equipment with which the apparatus is to be employed. For example, in driving a wheeled vehicle of any kind, the motor unit may be mounted in the wheel itself, and connected by suitable conduits to a centrally located pump such as the pumping unit illustrated herein. It will be observed that the motor unit may be employed in connection with any fluid pressure supply means and similarly the pumping unit of my assembly may be employed with any type of fluid motor. The two units are admirably suited, however, to be used in conjunction because of the similarity of their design and mode of operation. By maintaining a proper proportional relationship between the number and sizes of the pistons of the respective units, it is possible to produce a structure which has the maximum efficiency of operation.

It will be found that the apparatus of my invention has a satisfactorily high mechanical efficiency. This is due largely to the use of the anti-friction bearings which support the cam members at opposite ends of the rotors, and the further fact that there is little relative movement between these cam members and the ends of the pistons or plungers which are in engagement therewith. It will be found that when the angle of inclination of the axis of rotation of the cam member with respect to the axis of rotation of the rotor is not substantially in excess of about 14°, then the locus of contact points between the end of the plungers and the face of the cam member is an ellipse which deviates only very slightly from the true pitch circle. This deviation is compensated by variations in the relative rotational velocity between the plunger and rotor. That is, as the rotor rotates through one revolution, the pistons or plungers remain substantially stationary relative to the horizon, thereby making one rotation relative to the rotor. There is, therefore, no relative movement between the ends of the plungers and the contacting face of the cam member.

Figure 4:
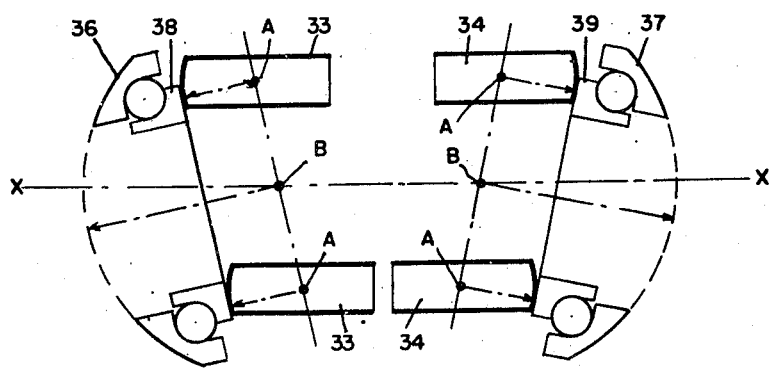
Fig. 4 is a diagrammatic representation of certain of the parts of the previous figures.

An important feature of the construction of either the motor or pump unit which is responsible for extremely low friction losses is illustrated in Fig. 4 where the parts have been numbered to correspond to the parts of the motor, although the principles illustrated in Fig. 4 have been observed in and are applicable to both the motor and pump.

The ends of the pistons or plungers 33 and 34 which engage the bearing members 38 and 39 are portions of a sphere, the centers of which lie on points A. The pillow blocks 36 and 37 oscillate on arcs whose centers are at B. It will be observed that a line joining centers A intersects the axis X—X of rotation of the rotor coincidental with the intersection of such axis by the radius of the circle of oscillation of the pillow blocks. For most economical and efficient operation, the angle of inclination of the axis of the pillow blocks with respect to the axis X—X of the rotor should be between 12° and 15°.

Other modes of apply'ng the principle of my invention may be employed, change being made as regards the details described, provided the features stated in any of the following claims or the equivalent of such be employed.

I, therefore, particularly point out and distinctly claim as my invention:

1. In a fluid displacement apparatus having a stator provided with inlet and outlet ports and a rotor in said stator, said rotor provided with a plurality of cylindrical openings extending axially therethrough and arranged in equally spaced relation in an annular area coaxial with said rotor, cylindrical pistons extending into each of said openings from each end thereof, said rotor provided with radially extending passages respectively leading outwardly from each of said openings intermediately of said pistons, and arranged to register with said inlet and outlet ports, an annulus at each end of said rotor arranged to be engaged by the pistons and being tiltable about an axis perpendicular to the rotor axis, said pistons projecting from the adjacent end of said rotor, the piston ends which engage with the annulus being of a convex contour generated by a radius of curvature greater than the piston diameter, and means including bearings in the stator for supporting said annulus for rotation about its axis, with its axis of rotation tiltable at an angle to the axis of the rotor and always intersecting the axis of the rotor rotation in the same plane which joins the center ends of the said radii of the contacting convex ends of the pistons.

2. In a fluid displacement apparatus having a stator provided with inlet and outlet ports and a rotor in said stator, said rotor provided with a plurality of cylindrical openings extending axially therethrough and arranged in equally spaced relation in an annular area coaxial with said rotor, cylindrical pistons extending into each of said openings from each end thereof, said rotor provided with radially extending passages respectively leading outwardly from each of said openings intermediately of said pistons and arranged to register with said inlet and outlet ports, spring means urging said pistons axially outwardly of said rotor, an annulus at each end of said rotor arranged to be engaged by the pistons projecting from the adjacent end of said rotor, the piston ends which engage therewith being of a convex contour generated by a radius of curvature greater than the piston diameter, and means including bearings in the stator for supporting said annulus for rotation about its axis, the axis of rotation of said annulus being tiltable to the axis of said rotor by an angle not substantially in excess of about 14° with its axis of rotation always intersecting the axis of the rotor rotation at the same plane which joins the center ends of said radii of the contacting convex ends of the pistons.

3. In a fluid displacement apparatus having a stator provided with inlet and outlet ports and a rotor in said stator, said rotor provided with a plurality of cylindrical openings extending axially therethrough and arranged in equally spaced relation in an annular area coaxial with said rotor, cylindrical pistons extending into each of said openings from each end thereof, the outer ends of said pistons being of a convex contour generated by a radius of curvature greater than the piston diameter, said rotor provided with radially extending passages respectively leading outwardly from each of said openings intermediately of said pistons and arranged to register sequentially with said inlet and outlet ports upon rotation of said rotor, an annular member at each end of said rotor arranged to be engaged by the pistons projecting from the adjacent end of said rotor, means including bearings in the stator for supporting said annular member for rotation about its axis with its axis of rotation always intersecting the axis of the rotor rotation at a plane which joins the center ends of the said radii of the contacting convex ends of the pistons, and means for adjustably inclining said annular members with respect to the axis of said rotor to engage the ends of said pistons nearer their periphery than the center.

4. In a fluid displacement apparatus having a stator provided with inlet and outlet ports and a rotor in said stator provided with cylindrical bores arranged substantially parallel with the rotor axis and having passages adapted to communicate with said ports, a reciprocable piston extending into each bore, the outer ends of each of said pistons being of a convex contour generated by a radius of curvature, the center of which lies on the axis of its piston, an annular bearing member adjacent the end of said rotor and engaged by the convex ends of said pistons, and means supporting said annular bearing for movement in a path such that the axis of said annular bearing member may be inclined to the axis of the rotor while maintaining at all times the point of intersection between the axis of the rotor and the axis of the bearing member in the plane which contains the centers of generation of said piston ends.

RICHARD W. HAUTZENROEDER.

REFERENCES CITED

The following references are of record in the file of this patent:

UNITED STATES PATENTS

| Number | Name | Date |
| --- | --- | --- |
| 657,409 | Gould | Sept. 4, 1900 |
| 1,212,655 | Magie et al. | Jan. 16, 1917 |
| 1,418,951 | Martin | June 6, 1922 |
| 1,539,616 | Williams | May 26, 1925 |
| 2,129,886 | Syrovy | Sept. 13, 1938 |
| 2,229,715 | Zimmerman | Jan. 28, 1941 |
| 2,331,694 | Jeffrey | Oct. 12, 1943 |
| 2,345,446 | Baker | Mar. 28, 1944 |

FOREIGN PATENTS

| Number | Country | Date |
| --- | --- | --- |
| 3,827 | Great Britain | Feb. 13, 1914 |
| 214,301 | Great Britain | Apr. 22, 1924 |
| 241,975 | Great Britain | Oct. 21, 1925 |